United States Patent
Stolorz

(10) Patent No.: US 11,074,599 B2
(45) Date of Patent: Jul. 27, 2021

(54) DETERMINING USAGE DATA OF MOBILE APPLICATIONS FOR A POPULATION

(71) Applicant: App Annie Inc., San Francisco, CA (US)

(72) Inventor: Paul Stolorz, San Francisco, CA (US)

(73) Assignee: App Annie Inc., San Francisco, CA (US)

( * ) Notice: Subject to any disclaimer, the term of this patent is extended or adjusted under 35 U.S.C. 154(b) by 105 days.

(21) Appl. No.: 15/373,291

(22) Filed: Dec. 8, 2016

(65) Prior Publication Data
US 2018/0165697 A1     Jun. 14, 2018

(51) Int. Cl.
*G06Q 30/00* (2012.01)
*G06Q 30/02* (2012.01)
*G06N 5/04* (2006.01)
*G06N 20/00* (2019.01)
*G06F 15/173* (2006.01)

(52) U.S. Cl.
CPC .......... *G06Q 30/0204* (2013.01); *G06N 5/04* (2013.01); *G06N 20/00* (2019.01); *G06Q 30/0254* (2013.01); *G06Q 30/0269* (2013.01); *G06F 15/173* (2013.01)

(58) Field of Classification Search
CPC .......... G06Q 30/0204; G06Q 30/0254; G06Q 30/0269; G06N 20/00; G06N 5/04; G06F 15/173
USPC ....................................... 705/7.33
See application file for complete search history.

(56) References Cited

U.S. PATENT DOCUMENTS

| 7,162,522 B2 * | 1/2007 | Adar ................ G06Q 30/02 709/224 |
| 8,069,076 B2 * | 11/2011 | Oddo ............... G06Q 30/02 705/7.29 |
| 9,280,749 B1 | 3/2016 | Porteous et al. |
| 2011/0004682 A1 * | 1/2011 | Honnold ............ G06Q 30/02 709/224 |
| 2012/0069748 A1 * | 3/2012 | Van Den Bogaert ........ H04W 24/10 370/252 |
| 2013/0339284 A1 | 12/2013 | Rowles et al. |

(Continued)

FOREIGN PATENT DOCUMENTS

| CN | WO 2017/219548 | * 12/2017 | ............. G06F 17/30 |
| CN | WO-2017/219548 | * 12/2017 | ............. G06F 17/30 |

OTHER PUBLICATIONS

PCT International Search Report and Written Opinion, PCT Application No. PCT/US17/65279, dated Mar. 6, 2018, 17 pages.

*Primary Examiner* — Hafiz A Kassim
*Assistant Examiner* — Tyrone E Singletary
(74) *Attorney, Agent, or Firm* — Fenwick & West LLP

(57) ABSTRACT

A utility application for a mobile device inspects data packets from other mobile applications running on the device to gather and record usage data about those applications. Since users of the utility application may not reflect the true population for which the usage data is desired, a system de-biases the data reported from the utility applications using a machine learning model to predict demographics of the users of the utility application. To determine a training data set for the model, the system requests a user to provide a desired user attribute by way of an in-app questionnaire. This enables labeling utility usage data with the demographics, which can be weighted and extrapolated to determine usage across the population as a whole.

16 Claims, 4 Drawing Sheets

(56) References Cited

U.S. PATENT DOCUMENTS

| | | | |
|---|---|---|---|
| 2014/0095692 A1 | 4/2014 | Anderson et al. | |
| 2014/0258506 A1* | 9/2014 | Stickle | H04L 67/22 |
| | | | 709/224 |
| 2015/0332317 A1* | 11/2015 | Cui | G06Q 30/0275 |
| | | | 705/14.46 |
| 2015/0356581 A1* | 12/2015 | Litmanovich | H04M 3/2218 |
| | | | 705/7.33 |
| 2015/0363289 A1 | 12/2015 | Brough | |
| 2016/0127210 A1 | 5/2016 | Noureddin et al. | |
| 2017/0026382 A1* | 1/2017 | Trigger | H04L 67/10 |
| 2017/0070398 A1* | 3/2017 | Singhal | G06N 7/005 |

* cited by examiner

DETERMINING USAGE DATA OF MOBILE APPLICATIONS FOR A POPULATION

BACKGROUND

This invention relates generally to the field of mobile application data metric determination, in particular to determining usage data for one or more mobile applications for a desired population.

Mobile devices such as mobile phones and tablets have many mobile applications installed on them. For a mobile application developer, or a business that builds mobile applications, it is very useful to discover the type of users that visit the mobile application. The most powerful and useful set of mobile data metrics include the number of visitors on a mobile application, the demographics of the users, and the number of visitors that may upgrade/purchase the mobile application.

In addition to tracking the mobile application visitors and associated metrics, it is helpful to track the user's behavior in a mobile application. For example, tracking the usage data of a mobile application amongst various demographic groups is useful. In most cases, the users of a mobile application do not reflect the demographics of the true population for which the usage data is desirable, and must therefore be de-biased to generate accurate metrics about the true population. A basic problem that arises in determining data metrics related to usage behavior for mobile application is how to de-bias the set of users for whom there is no demographic information available.

SUMMARY

A mobile application provides a utility application for the mobile device. In one embodiment, the utility application may be a virtual private network (VPN) access for the mobile device. The VPN access allows a user to securely access mobile applications included in a private network, for example, email application from an employer, documents residing on an employer server, and other such applications. Additionally, the VPN enables access to other mobile applications that are not a part of the private network and allows the other mobile applications to send and receive data across shared or public networks, such as the Internet. The data or requests from the other mobile applications are sent via a private network interface of the VPN application. The VPN application may inspect the data packets from the other mobile applications to gather and record usage data about those applications. In another embodiment, the utility application is any other third party utility mobile application that can inspect the data packets from other mobile applications to gather and record usage data about those applications.

A de-biasing module in combination with the VPN application determines usage data for a desired population. For the plurality of users, the de-biasing module includes a machine learning model that predicts if a user has a desired user attribute, wherein the user attribute may indicate demographic information of the user. To determine a training set for the model, the de-biasing module may collect the user attribute information, with user's consent, from a utility data collection application installed on the device of the user, for example, by way of an in-app questionnaire. In another embodiment, the de-biasing module observes the data packets inspected by the utility application, to determine a subset of users that are served advertisements purchased from a third-party system. The advertisements include a targeting criterion wherein only users who have the desired user attribute are eligible to receive the advertisement. If a user is served the advertisement, the de-biasing module assigns the user attribute to the user. Based on the subset of users that are assigned the user attribute, the machine learning module may predict for other users, if they have the user attribute, and if so, assign the user attribute accordingly.

Since users of the utility application may not reflect the true population for which the usage data is desired, the de-biasing module further de-biases the usage data reported by the users labeled with the desired user attribute. An aggregate of the user attribute of the plurality of users who use the utility application are compared with an aggregate of the user attribute for a desired population for example, the desired population may be obtained from the census data. The usage data is weighted based on the comparison of the aggregates of the user attribute. Based on the weighted usage data, a report is generated of the usage data for the desired population, for example Mbs used per session by females aged 30 and above from the desired population.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
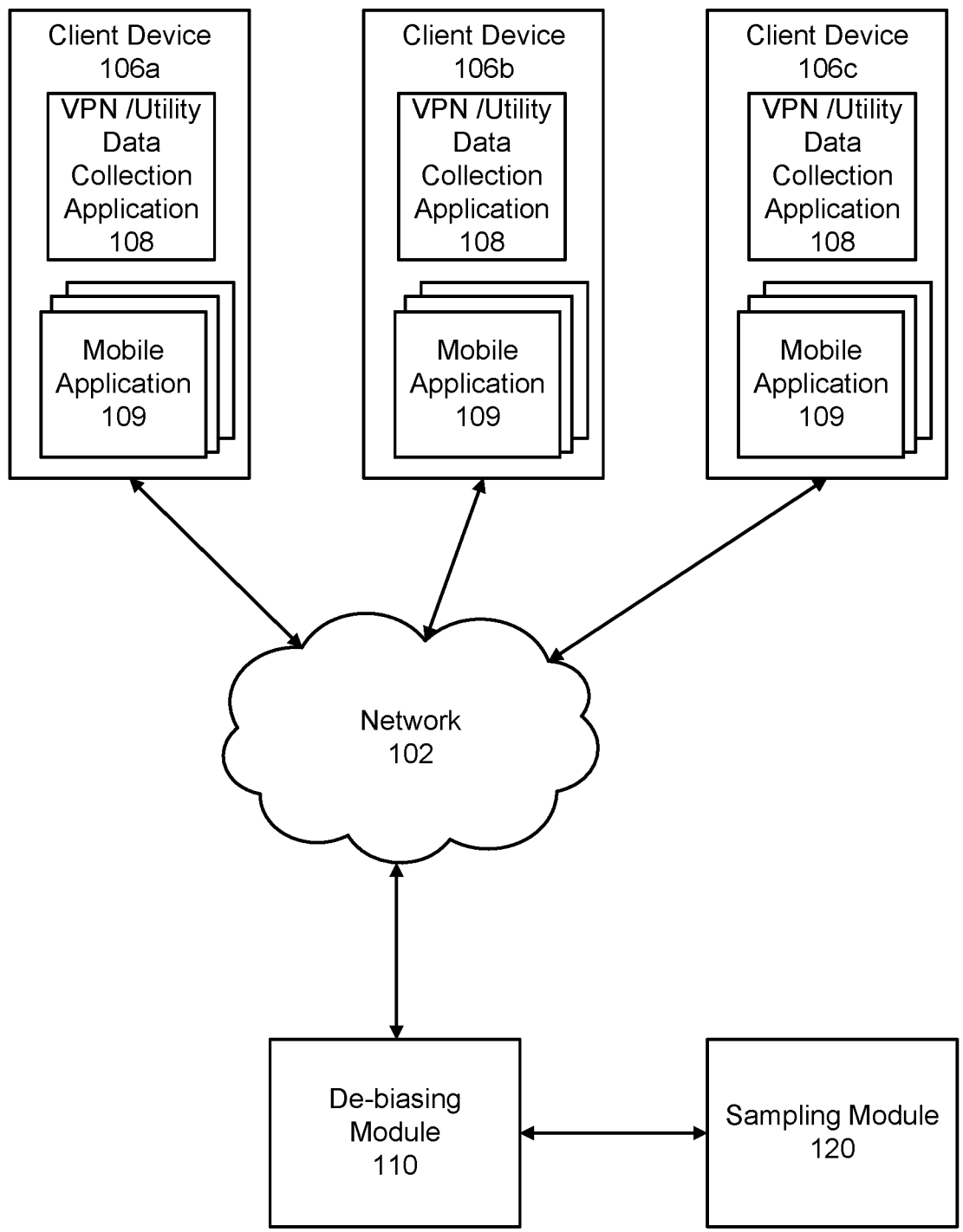
FIG. 1 is a block diagram illustrating a computing environment for de-biasing a set of mobile application users according to one embodiment of the present disclosure.

FIG. 1 is a block diagram illustrating a computing environment for de-biasing a set of mobile application users according to one embodiment of the present disclosure. The computing environment 100 shown by FIG. 1 comprises one or more client devices 106, a network 102, a de-biasing module 110 and a sampling module 120. In alternative configurations, different and/or additional components may be included in the system environment 100.

The client devices 106 are one or more computing devices capable of receiving user input as well as transmitting and/or receiving data via the network 102. In one embodiment, a client device 106 is a smartphone, a tablet or a conventional computer system, such as a desktop or laptop computer. Alternatively, a client device 106 may be a device having computer functionality that accesses a set of mobile applications 109. A client device 106 is configured to communicate via the network 102. In one embodiment, a client device 106 executes an application 109 allowing a user of the client device 106 to interact with the de-biasing module 110. For example, a client device 106 executes a browser application to enable interaction between the client device 106 and the de-biasing module 110 via the network 102. In another embodiment, a client device 106 interacts with the de-biasing module 110 through an application programming interface (API) running on a native operating system of the client device 106, such as IOS® or ANDROID™. In another embodiment, a client device 106 interacts with the de-biasing module 110 via the utility application 108 that may be a data collecting application executing on the client device 106.

The client devices 106 are configured to communicate via the network 102, which may comprise any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 102 may be encrypted using any suitable technique or techniques.

The de-biasing module 110 determines usage data of one or more mobile applications for a desired population, wherein the desired population may be different than the utility application users. The de-biasing module 110 includes a machine learning model to predict whether a user of the plurality of users has a user attribute, the user attribute may be related to the demographic information of the user. In one embodiment, to determine a training set for the model, the de-biasing module 110 communicates with the utility application 108 on the client device 106 to request a user's permission to collect user attribute data of the user of the client device 106. For example, the utility application 108 may request the user to fill a form that includes user attribute information such as gender, age, usage of an application and other such information. Based on the collected information, the de-biasing module 110 determines uses this information to assign a user attribute to a plurality of users of the utility application. Based on the user attribute information of the plurality of users using the applications, the model is trained to predict whether a utility application 108 user of the plurality of users has a user attribute.

In another embodiment, to determine a training set for the model, the de-biasing module 110 communicates with the utility application 108, such as a VPN application, on the client device 106 to observe a subset of plurality of users who have been served advertisements that include a targeting criterion related to a desired user attribute, by inspecting data packets by the utility application 108. The advertisement is displayed on a client device 106, the advertisement may be purchased from a third-party system and is displayed to a user who is eligible to be served with the advertisement, i.e. the user has the user attribute included in the targeting criterion of the advertisement. The utility application 108 monitors the network traffic to determine which client device downloaded/installed the application of the advertisement. The utility application 108 may use an application rule dictionary that stores rules (e.g. regular expressions) that match the network traffic generated by an application. The utility application 108 communicates the information to the de-biasing module 110.

Based on the information, the de-biasing module 110 determines which advertisements were served to which client devices 106 and uses this information to assign a user attribute to a plurality of users of the utility application 108. Based on the user attribute information of the plurality of users who were served the advertisement, the model is trained to predict whether a utility application 108 user of the plurality of users has a user attribute or not. The utility application 108 determines a usage of an application on the client device 106 and reports it to the de-biasing module 110. The de-biasing module 110 aggregates the received usage data to determine the combined application usage statistic, and may group the usage data by a user attribute such as a specific user demographics.

The usage data for an application is biased based on the user attributes of the utility application users. Since the utility application users may not reflect a sample population (or a desired population) for which the usage data is desired, the de-biasing module 110 de-biases the usage data. To de-bias the usage data, or any other data metric, a sample population (or a desired population) that includes the user attribute, is obtained by the sampling module 120. The sampling module 120 may conduct surveys to obtain the sample population for each desired user attribute. The sampled population is sent to the de-biasing module 110. The de-biasing module 110 further weights the usage data for the user attribute by comparing the aggregate utility app usage data for a given attribute with an aggregate of the user attribute from the sampled population. Based on the weighted usage data set, a report of the usage data or any other data metric, for example, Mbs used per session is generated for the sampled population.

Figure 2:
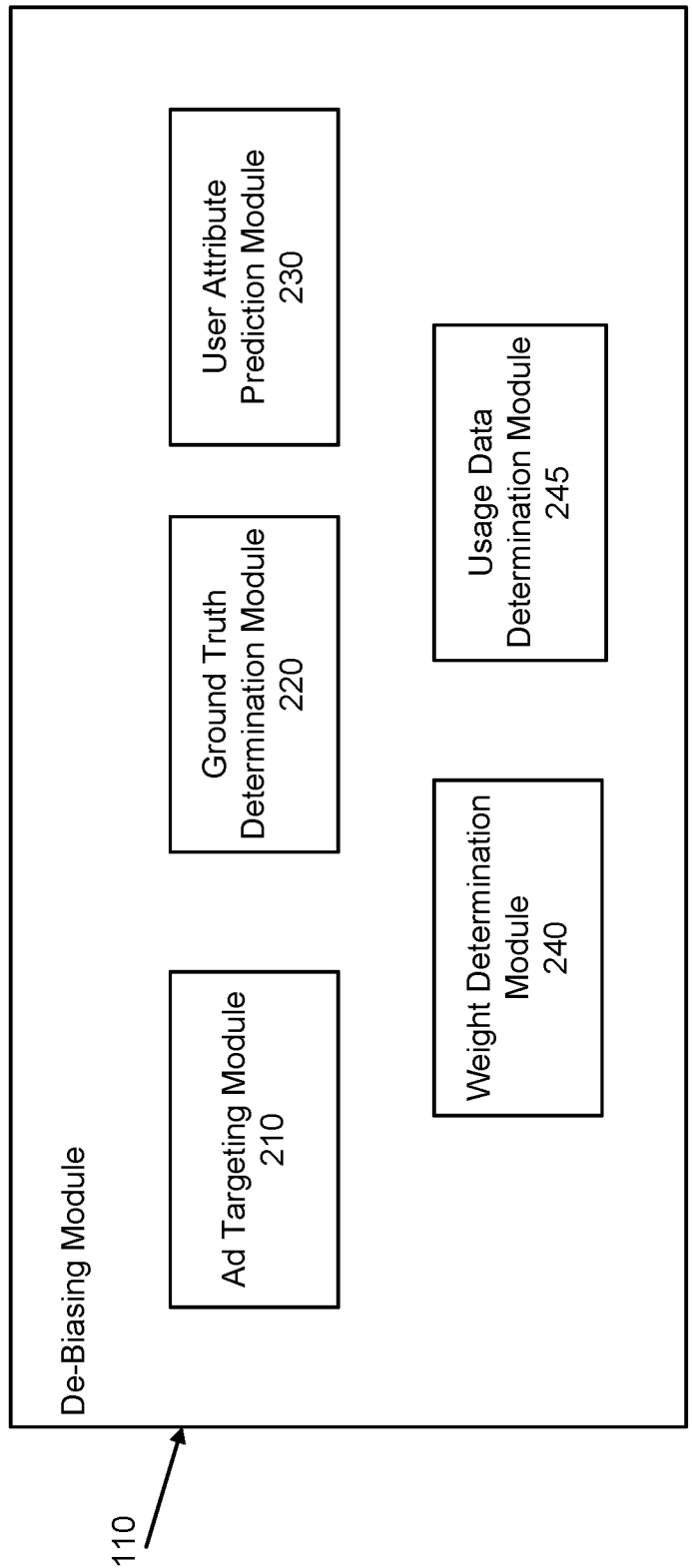
FIG. 2 is a block diagram illustrating logical components of a de-biasing module according to one embodiment of the present disclosure.

FIG. 2 is a block diagram illustrating logical components of a de-biasing module according to one embodiment of the present disclosure. The de-biasing module 110 includes an ad targeting module 210, a ground truth determination module 220, a user attribute prediction module 230, a weight determination module 240 and a usage data determination module 245.

The ad targeting module 210 purchases advertisements with a targeting criterion from a third-party system, the advertisements are displayed on the client device 106, for example, display within a mobile application. The targeting criterion is matched to a desired demographic such as the gender, age, marital status, education, ethnicity and other such demographics. Different types of advertisements are purchased for each desired user attribute, each advertisement annotated with the targeting criterion such as, displaying an advertisement for female users with a target age group 25-35 years. An example advertisement includes toddler fashion apparel shopping mobile application that generally female users within the age group 25-35 years that have toddlers would be interested in and would download and install the application.

The purpose of purchasing the advertisements is to collect user attribute (e.g. demographic) data for a utility application 108 user, in order to determine ground truth (i.e. gather data for a training set for a computer model). In one embodiment, the ground truth determination module 220 obtains the user attribute information from the utility collection application 108. The ground truth determination module 220 may send a request to the utility application (i.e. a VPN or utility data collection application) 108 to gather a user's attribute information by way of presenting a questionnaire, and with the user's content, access the attribute information of the user. In response to the request, the user may provide the related information, such as gender, age, sex of the user. The ground truth determination module 220 may gather the information and assign attribute group labels to each user of the utility application user.

In another embodiment, the ground truth determination module 220 receives the advertisement information from the ad targeting module 210, i.e. the time and user the advertisement was served to, along with the targeting criterion of the advertisement. The ground truth determination module 220 monitors the network interface to determine which ads were served to which users and if the user of the client device 106 downloaded and installed the applications displayed within the advertisement. The ground truth determination module 220 assigns a user attribute to the client device 106 user based on the targeting criterion of the served advertisement and the fact that the user downloaded and installed the advertised mobile application. For example, if a client device 106 user downloads the displayed toddler fashion apparel shopping application, the client device 106 user is assigned "gender=female" and "age group=25-35" years.

In another embodiment, the ground truth determination module 220 assigns a confidence value for each assignment of the user attribute information to the user. The confidence value indicates the probability of the assignment, i.e. what is the probability that the user belongs to the assigned user attribute group. A higher confidence value indicates a higher probability of the assignment and vice versa. For example, a confidence value of 90% for the assigned "gender=female" indicates that the user is highly likely a female user. A confidence value of 60% for the "age group=25-35 years" indicates there is a 60% probability that the user is within the age range 25-35 years.

Once the ground truth is determined, the user attribute prediction module 230 generates a computer model that predicts whether a utility application user has a user attribute or not. The determined ground truth (i.e. the assigned users) is used as a training set to train the computer model. The computer model generates a function that fits the training set data, such that the computer model can further predict the user attribute information of a user using the function. The function includes model parameters that may be adjusted based on differences between the fitted function and the training set.

Once the computer model is trained, the user attribute prediction module 230 predicts a user attribute for each utility application 108 user and assigns a user attribute label to the user. For example, a user may be assigned labels "gender=female", "age group=25-35 years", "marital status=married" and other such labels.

The utility application 108 on each client device can determine usage data for the other applications 109 executing on the client device 106. The utility application 108 collects the usage data for each user and reports it to the user attribute prediction module 230. Further, the user attribute prediction module 230 aggregates the usage data based on the user attribute label of the user. For example, usage data for a mobile application Starbucks is collected from the utility application 108 of each client device 106 and aggregated based on the user attribute information of the user of the client device 106, i.e. number of males using the Starbucks application, age group=25-30 years using the Starbucks application.

The weight determination module 240 weights the aggregated usage data. The weight determination module 240 receives an aggregate of the user attribute of the utility application users from the user attribute prediction module 230. Further, the weight determination module 240 receives an aggregate of the user attribute for a desired population from the sampling module 120. In one embodiment, the weight determination module 240 compares the aggregates of the user attribute of the utility application users to the desired population from the sampling module 120 to determine a weighting ratio for that attribute. Based on the ratio, the usage data for each user of a given app for a given user attribute is weighted, thus de-biasing the set of utility application users of the user attribute. In another embodiment, the usage data weight for the utility application users is discounted using the confidence value associated with each user attribute label. An aggregated confidence value can be determined by combining the confidence values associated with each user within the user attribute label. Each user included in the usage data of a user attribute group is weighted, by either a regular weighting ratio, or by a discounted weight if one is used. For example, for a demographic "gender", i.e. number of females using the Starbucks application, if the sample population indicates that 50% of the population are female, and the determined usage data indicates that 80% of the utility app users are female, then the weight associated with the determined usage data for the demographic "gender=female" is 50/80=0.625 (females are over-represented amongst utility app users). If the raw usage data indicates that 71% of Starbucks users are female, the value for the de-biased Starbucks metric is 71%*0.625=44.3% female. The weighting ratios for multiple user attributes can be multiplied together to obtain an overall weight for each user or, in another embodiment, can be calculated separately for each multi-dimensional combination of attributes.

The usage data determination module 245 receives the weighted/unbiased usage data of the utility application users based on the user attribute. Based on the weighted usage data, the usage data determination module 245 may extrapolate the data to the entire set of the population using known extrapolation methods such as linear extrapolation, polynomial extrapolation or any other such method. Further, on receiving a request to generate a usage data report for a sample population or a specific user attribute of the sample population, the usage data determination module 245 generates the report from the un-biased usage data. Examples of usage data reports for a specific user attribute include average length of a session, the number of active male users, the number of active female users, weekly active users, daily active users, monthly active users, data used in MB/user, data used in MB/session, and other such data for a mobile application.

Figure 3A:
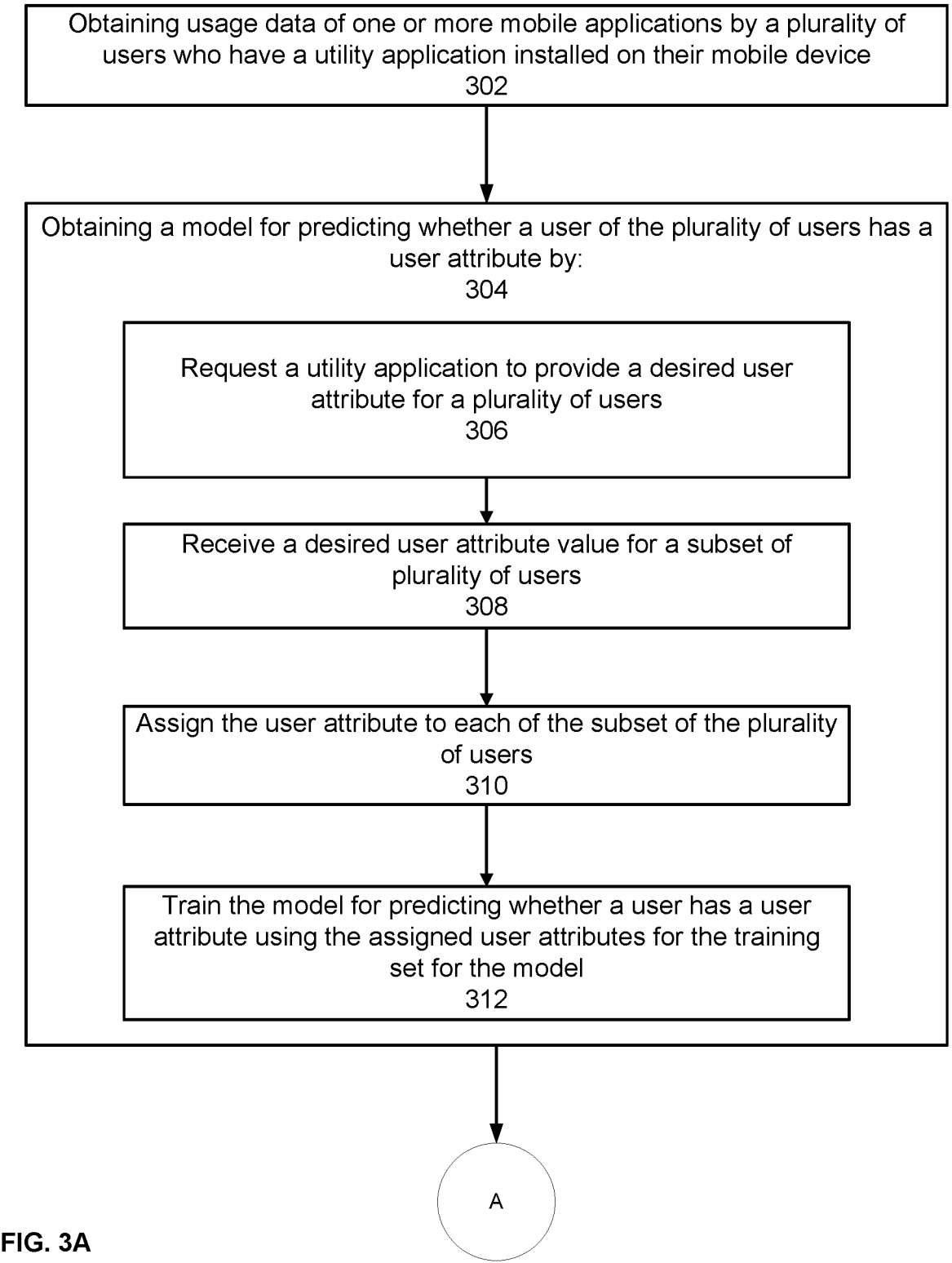
FIGS. 3A-3B together form is a flow diagram illustrating a method for determining for one or more mobile applications for a desired population, according to one embodiment of the present disclosure.
Figure 3B:
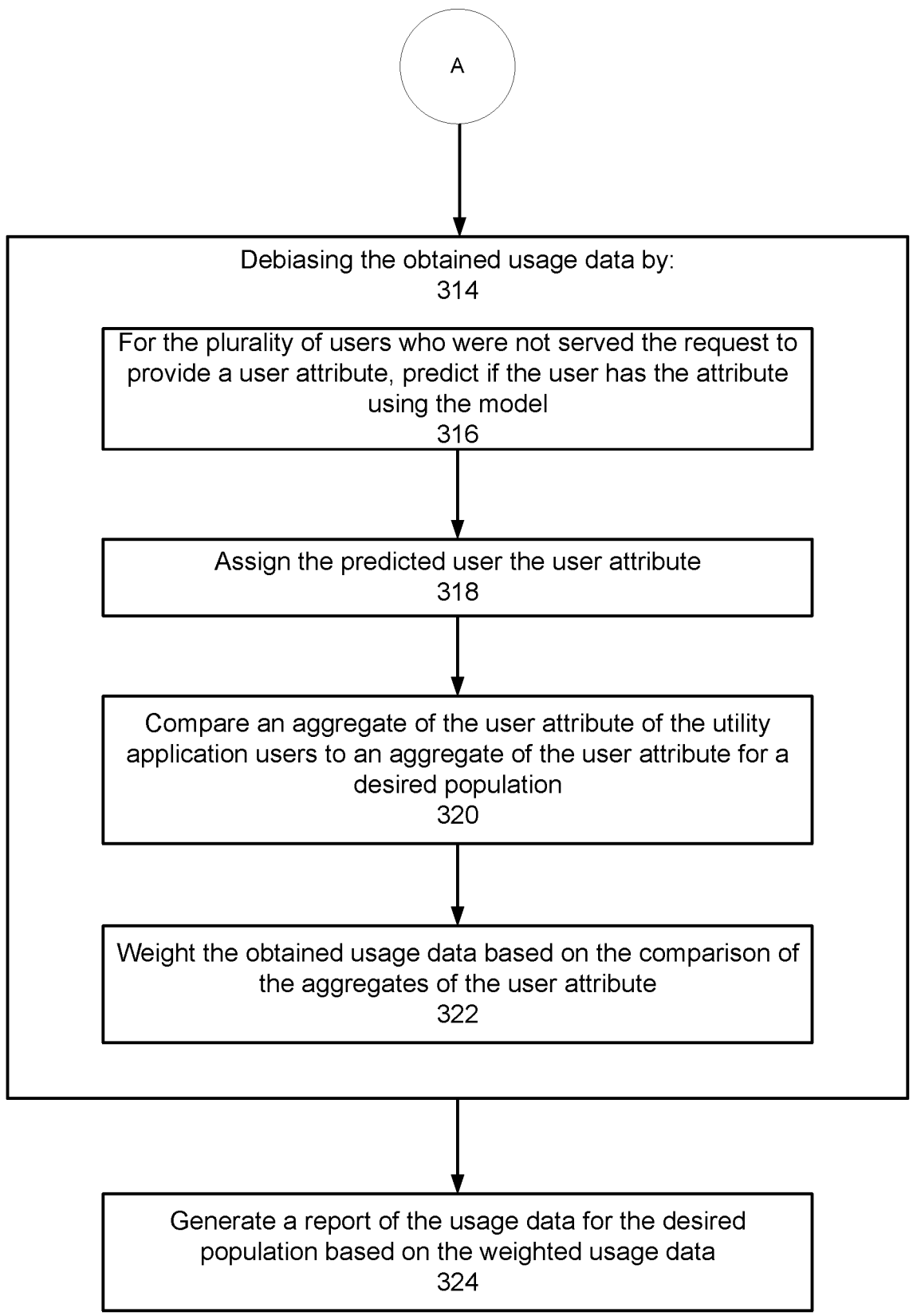

FIGS. 3A-3B together form a flow diagram illustrating a method for determining for one or more mobile applications for a desired population, according to one embodiment of the present disclosure. The utility application 108 monitors and analyzes the network traffic to and from a client device 106 to determine usage of one or more mobile applications on the client device 106. The de-biasing module 110 obtains 302 the usage data for one or more mobile applications for a plurality of users tracked by the utility application 108. The de-biasing module 110 further obtains 304 a model for predicting whether a utility application user has a user attribute. To obtain the model, the de-biasing module 110 performs the steps 306 to 312 as described further. In one embodiment, the de-biasing module 110 may send a request 306 to a user to provide a desired user attribute. For example, the utility application 108 may request a user to provide their gender, age or any other such user attribute. In another embodiment, the de-biasing module 110 purchases 306 advertisements from a third party system with a targeting criterion that match a user attribute, i.e. the user that has the user attribute is eligible to be served the advertisement. The advertisements are displayed on the client devices 106, in most cases by one or more mobile applications that serve advertisements. Once an advertisement is displayed on the client device 106, the utility application 108 monitors the network traffic to determine which ads were clicked on or downloaded by a client device 106 and forwards the information to the de-biasing module 110. The de-biasing module 108 observes 308 a subset of the plurality of users to determine which ads were served to which user, and further which ads were consumed by which users and based on the determination, assigns 310 the user attribute to the user. The de-biasing module uses the assigned data as a training set to train 312 a computer model that predicts whether a utility application user has a user attribute or not.

Since the usage data collected is biased towards utility application users, the de-biasing module 110 further de-biases 314 the obtained usage data by performing the steps described from 316 to 322. The de-biasing module 110 predicts 316 if a user, from the plurality of users that were not served the advertisements, has the user attribute, using the computer model. If the user does have the user attribute, the de-biasing module 110 assigns 318 the user attribute to the user. Based on the assigned user attribute labels, the de-biasing module 110 aggregates the usage data of the utility application users based on the user attribute.

The de-biasing module 110 further receives the usage data for a sample population, based on the user attribute. The de-biasing module 110 compares 320 the aggregate of the user attribute of the utility application users to an aggregate of the user attribute for the sample population. Based on the comparison, the usage data is weighted 322, i.e. the obtained usage data from the utility application users is adjusted to fit the user attribute of the sample population. Based on the weighted usage data for the sample population, the de-biasing module generates a report of the usage data based on the user attribute, e.g. Mbps used per session within a demographic population and other such user attributes.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for determining usage data of one or more mobile applications for a desired population, the method comprising:
    obtaining, via a utility application inspecting data packets on each of a plurality of mobile devices, network usage data for a plurality of mobile applications, each mobile application installed on one of the plurality of mobile devices;
    for each of a plurality of users who have the utility application installed on one of the plurality of mobile devices, predicting, based on output from a machine learning model formed by inputting the network usage data into the machine learning model, whether the user has a user attribute, wherein the machine learning model is trained by:
        identifying an advertisement for a downloadable application served to a client device, the advertisement having targeting criteria;
        determining whether the downloadable application was installed by the user;
        responsive to determining that the downloadable application was installed by the user, generating an association between an identifier of the client device to the assigned targeting criteria;
        as network traffic is received from the client device, generating training data comprising network activity of the client device that is labeled using the targeting criteria; and
        training the machine learning model using the generated training data;
    determining that the network usage data is biased based on a comparison of an aggregate of the predictions of whether each of the plurality of users has the user attribute with an aggregate of the user attribute for a desired population;

de-biasing the obtained biased network usage data by weighting the obtained biased network usage data based on the comparison of the aggregates of the user attribute; and generating a report of network usage data for the desired population based on the weighted biased network usage data.

2. The method of claim 1, wherein the biased network usage data for the plurality of mobile applications is extrapolated to determine network usage data for a user of the plurality of users who have the utility application installed on one of the plurality of mobile devices.

3. The method of claim 1, further comprising assigning the obtained biased network usage data a confidence score by aggregating confidence scores associated with the predictions of whether each of the plurality of users has the user attribute.

4. The method of claim 3, wherein the weighting of the obtained biased network usage data is discounted by the assigned confidence score of the obtained biased network usage data.

5. The method of claim 1, wherein the utility application is a data collecting utility application.

6. The method of claim 1, further comprising generating the machine learning model, the generating comprising:
   requesting each of a second plurality of users to input a user demographic attribute into an in-app questionnaire;
   receiving, based on the input as received from the second plurality of users, a value for the user demographic attribute for at least a subset of the second plurality of users;
   assigning the user demographic attribute to each of the subset of the second plurality of users; and
   training the model for predicting whether a user has the user demographic attribute using a training set including the assigned user demographic attributes.

7. A computer program product for tracking usage of applications on a mobile device, the computer program product comprising a computer-readable storage medium comprising computer program code for:
   obtaining, by a utility application inspecting data packets, network usage data for a plurality of mobile applications, each mobile application installed on one of a plurality of mobile devices;
   for each of a plurality of users who have the utility application installed on one of the plurality of mobile devices, predicting, based on output from a machine learning model, whether the user has a user attribute, wherein the machine learning model is trained by:
      identifying an advertisement for a downloadable application served to a client device, the advertisement having targeting criteria;
      determining whether the downloadable application was installed by the user;
      responsive to determining that the downloadable application was installed by the user, generating an association between an identifier of the client device to the assigned targeting criteria;
      as network traffic is received from the client device, generating training data comprising network activity of the client device that is labeled using the targeting criteria; and
   training the machine learning model using the generated training data;
   determining that the network usage data is biased based on a comparison of an aggregate of the predictions of whether each of the plurality of users has the user attribute with an aggregate of the user attribute for a desired population;
   de-biasing the obtained biased network usage data by weighting the obtained biased network usage data based on the comparison of the aggregates of the user attribute; and
   generating a report of network usage data for the desired population based on the weighted biased network usage data.

8. The computer program product of claim 7, wherein the computer-readable storage medium further comprises computer program code for extrapolating the obtained biased network usage data for the plurality of mobile applications to determine network usage data for a user of the plurality of users who have the utility application installed on one of the plurality of mobile devices.

9. The computer program product of claim 7, wherein the computer-readable storage medium further comprises computer program code for assigning the obtained biased network usage data a confidence score by aggregating confidence scores associated with the predictions of whether each of the plurality of users has the user attribute.

10. The computer program product of claim 9, wherein the weighting of the network usage data is discounted by the assigned confidence score of the obtained biased network usage data.

11. The computer program product of claim 7, wherein the utility application is a virtual private network (VPN) application.

12. The computer program product of claim 7, wherein the utility application is a data collecting utility application.

13. A system for determining network usage data of one or more mobile applications for a desired population, the system comprising:
   one or more computer processors; and
   a non-transitory computer-readable storage medium comprising computer executable code that when executed by the one or more processors causes the one or more processors to perform operations comprising:
      obtain, by a VPN application inspecting data packets, network usage data for a plurality of mobile applications, each mobile application installed on one of a plurality of mobile devices;
      for each of a plurality of users who have the VPN application installed on one of the plurality of mobile devices, predict, based on output from a machine learning model formed by inputting the network usage data into the machine learning model, whether the user has a user attribute, wherein the machine learning model is trained by:
         identifying an advertisement for a downloadable application served to a client device, the advertisement having targeting criteria;
         determining whether the downloadable application was installed by the user;
         responsive to determining that the downloadable application was installed by the user, generating an association between an identifier of the client device to the assigned targeting criteria;

as network traffic is received from the client device, generating training data comprising network activity of the client device that is labeled using the targeting criteria; and training the machine learning model using the generated training data;

determine that the network usage data is biased based on a comparison of an aggregate of the predictions of whether each of the plurality of users has the user attribute with an aggregate of the user attribute for a desired population;

de-bias the obtained biased network usage data by weighting the obtained biased network usage data based on the comparison of the aggregates of the user attribute; and generate a report of network usage data for the desired population based on the weighted biased network usage data.

14. The system of claim 13, wherein the operations further comprise extrapolating the biased network usage data for the plurality of mobile applications to determine network usage data for a user of the plurality of users who have the utility application installed on one of the plurality of mobile devices.

15. The system of claim 13, wherein the operations further comprise assigning the obtained network usage data a confidence score by aggregating confidence scores associated with the predictions of whether each of the plurality of users has the user attribute.

16. The system of claim 15, wherein the weighting of the network usage data is discounted by the assigned confidence score of the obtained biased network usage data.

* * * * *